No. 885,137. PATENTED APR. 21, 1908.
W. G. R. BRAEMER.
AIR PURIFYING APPARATUS.
APPLICATION FILED SEPT. 11, 1907.
2 SHEETS—SHEET 1.
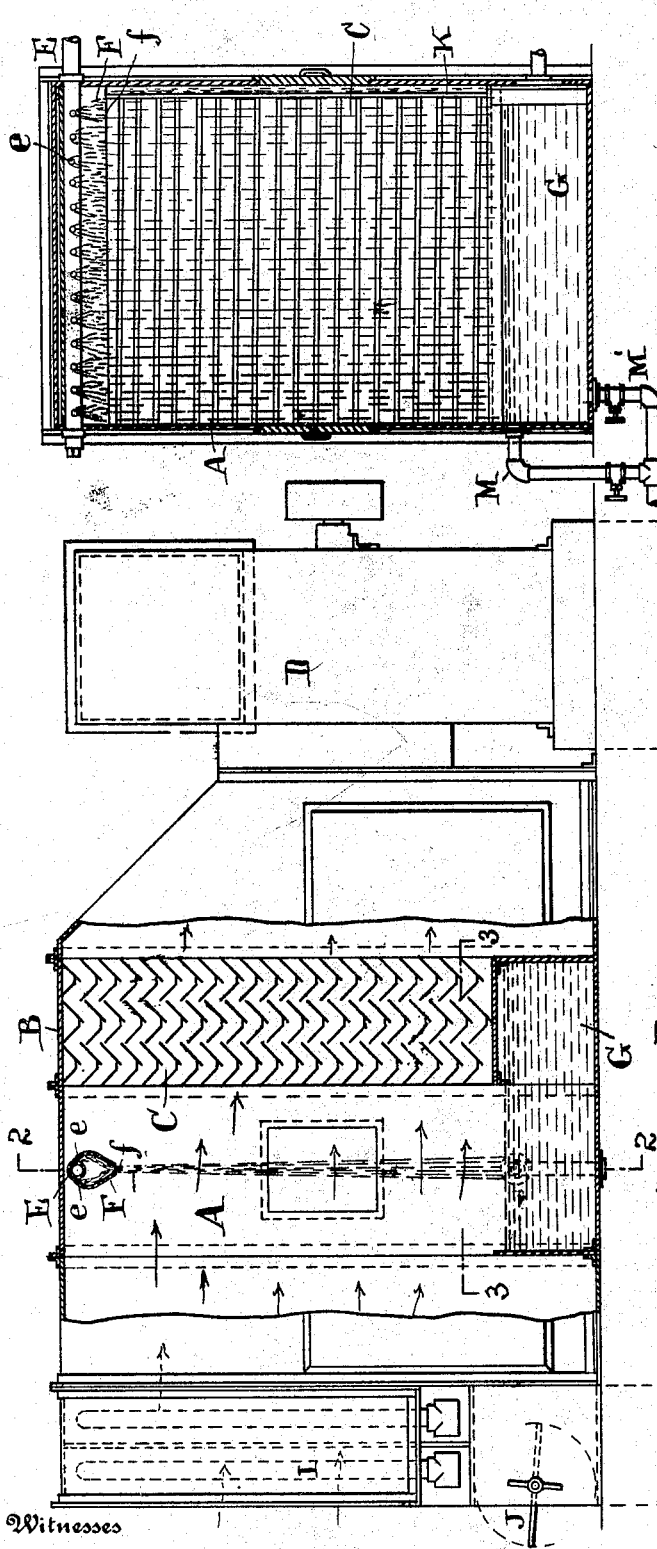
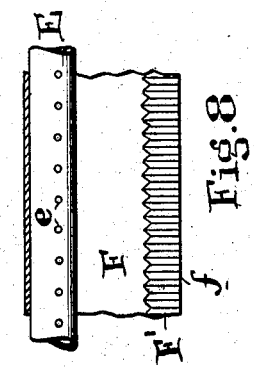
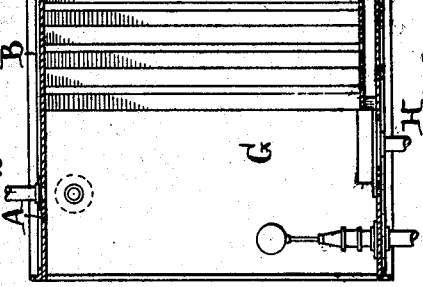
Witnesses
Daniel Webster, Jr.
R. M. Kelly
Inventor
William G. R. Braemer
By
Attorney No. 885,137. PATENTED APR. 21, 1908.
W. G. R. BRAEMER.
AIR PURIFYING APPARATUS.
APPLICATION FILED SEPT. 11, 1907.
2 SHEETS—SHEET 2.
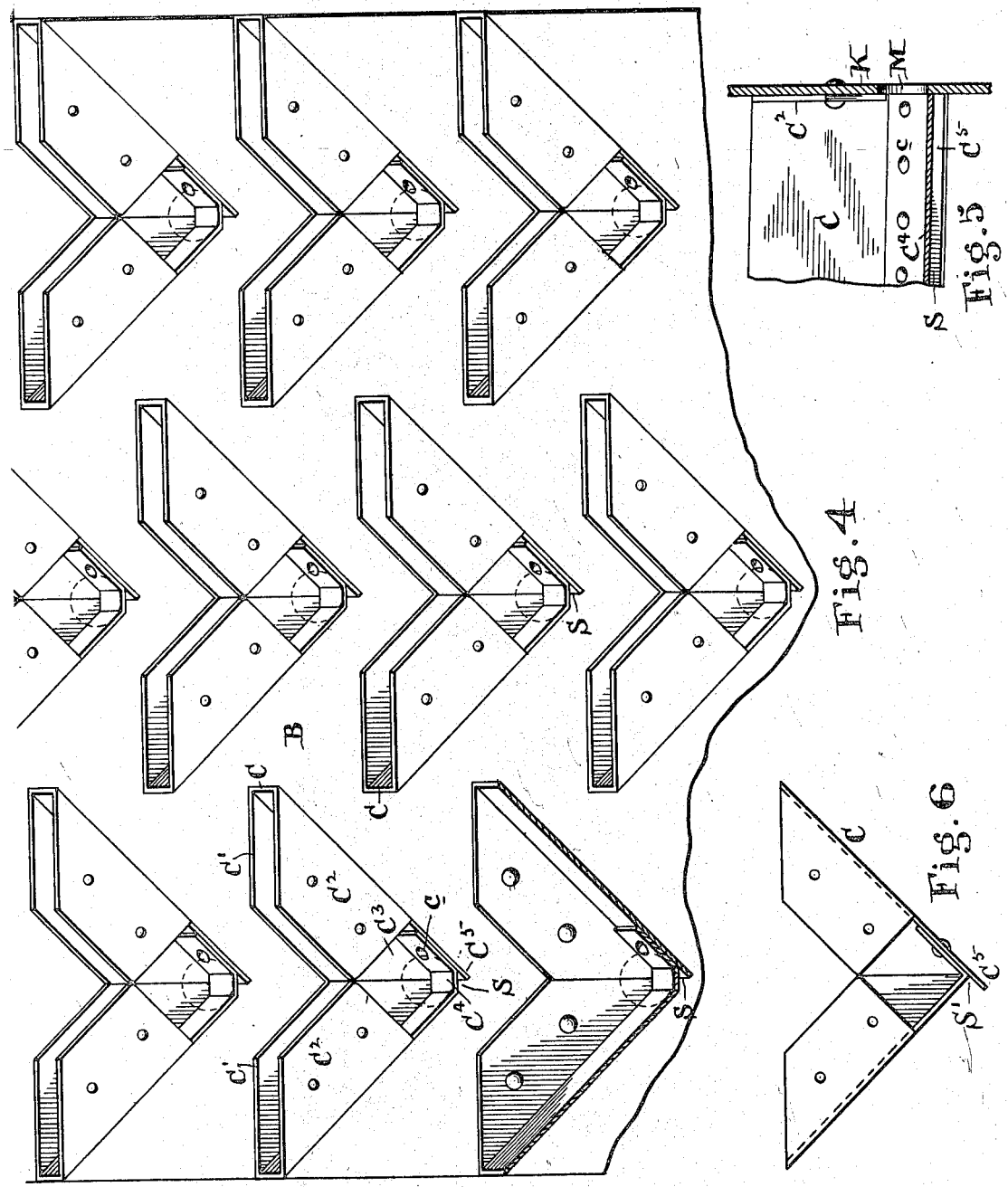

UNITED STATES PATENT OFFICE.

WILLIAM G. R. BRAEMER, OF BUFFALO, NEW YORK, ASSIGNOR TO WARREN WEBSTER & COMPANY, A CORPORATION OF NEW JERSEY.

AIR-PURIFYING APPARATUS.

No. 885,137.　　　Specification of Letters Patent.　　　Patented April 21, 1908.

Application filed September 11, 1907. Serial No. 392,251.

*To all whom it may concern:*

Be it known that I, WILLIAM G. R. BRAEMER, of the city of Buffalo, county of Erie, and State of New York, have invented an Improvement in Air-Purifying Apparatus, of which the following is a specification.

My invention has reference to air purifying apparatus, and consists of certain improvements which are fully set forth in the following specification, and shown in the accompanying drawings, which form a part thereof:—

My invention has for its object the treatment of air supplied to buildings for ventilating purposes whereby the air is cleaned by freeing it from impurities such as dust and dirt carried in suspension before admitted to the building; further, to cool the air prior to its admission into circulation in the building to make it adapted for conditions of warm weather, and also to add moisture in those cases where it is necessary to impart to the air the humidity required in special cases.

My invention consists in certain constructions whereby the air may be properly washed by contact with moving bodies of water, said constructions embodying a means for the production of one or more sheets of water through which the air is caused to pass under the action of a circulating means, combined with a series of trough-shaped bars having inclined surfaces against which the moist air is caused to impinge for the purpose of scouring the air and separating the water therefrom, said trough-shaped bars carrying the surplus water laterally away from the circulating air, and also being preferably provided on their lower parts with obstructing shoulders to arrest the travel of the water in the direction of the air and cause it to be precipitated into the respective trough-shaped bars immediately below.

My invention also comprehends other features of construction which, together with those above specified, will be better understood by reference to the drawings, in which:—

Figure 1 is a side elevation of an air purifying apparatus with a portion in section and embodying my invention; Fig. 2 is a cross sectional elevation of the same on line 2—2 of Fig. 1; Fig. 3 is a sectional plan view of a portion of the same on line 3—3 of Fig. 1; Fig. 4 is a side elevation of a portion of the washing apparatus of my improvements with a part in section; Fig. 5 is a sectional elevation showing the manner in which the water passes from the trough-shaped bars; Fig. 6 is an end view of a modified form of my improved trough-shaped bars; Fig. 7 is a cross section of means for forming sheets of washing water; and Fig. 8 is an elevation of the same.

A is the washing compartment, and B is the scouring and separating compartment, both of which are over a tank G for collecting the water which may be employed for washing and scouring of the air. This tank may be provided with an over-flow pipe M and drain pipe M' of any suitable construction. The water is drawn from the tank G at H and supplied to the compartment A from a horizontal pipe E at the top, said pipe being provided with lateral openings on its opposite sides at intervals, as indicated at $e$. Fitting over the pipe is a copper hood F which has lower flanges at $f$ from which the water flows in sheet or rain form. In this manner, the lateral jets from E are caused to spread and the water leaves the edges $f$ in a thin sheet of rain entirely across the compartment A. Instead of bringing the edges $f$ near together, they may be kept apart as shown in Fig. 7, so that two distinct sheets of water are formed separated by a decided space permitting readjustment of the air molecules after passing the first body of water. To insure these sheets of water being uniform, I prefer to provide the edges $f$ with fine corrugations $F'$, as shown in Figs. 7 and 8, to cause a multiplicity of closely arranged lines of drops like rain in sheet form. This gives the best results in practice.

The suction of the fan D causes the air to enter the compartment A and pass through the sheets of water falling therein, as indicated by the arrow. The air is by this means propelled through the apparatus and washed, and the water-laden air thus produced is then passed to the compartment B which contains a large number of transversely arranged grooved bars C to separate the surplus water from the air. These bars are essentially trough-shaped and present oblique surfaces to the advancing air, against which surfaces the air is caused to impinge with the result of mechanically separating the water from the air and causing it to run down the inclined face of the trough-shaped bars till it arrives at the bottom; it is there met by a shouldered portion which prevents the water being carried beyond, and this shouldered portion presents a lower edge from which the water drips downward into the trough-shaped bar immediately below. As these bars are on an incline, the collected water received in them is caused to flow toward a partition K at one side of the compartment B and pass through orifices M (Fig. 5) into the compartment L which leads down to the tank G below. Ordinarily, I prefer three vertical rows of these trough-shaped bars as indicated in Fig. 1, but one or more sets may be employed, as preferred. Furthermore, I prefer to stagger the trough-shaped bars, so that the air striking the front face of the bar next to the compartment A will be deflected under the said bar and strike the inclined face of the next bar at a slightly lower level, and so on with successive bars. There is a separation between the bars of each vertical row to permit the full and free distribution of the air to meet any difference of obstruction by excessive water dropping from any bar, as it is desirable to keep the resistance to the passage of the air down to a minimum consistent with proper washing and scouring.

The specific construction of my improved bars will be better understood by reference to Figs. 4, 5 and 6. In Fig. 4, the plate K is removed, and the end view of the bars is shown and these appear slightly in perspective because the end nearest to the observer is somewhat lower than the most distant end for the purpose of causing the water to flow toward the observer and toward the plate K when in place. These trough-shaped bars are formed of two plates which are united at the bottom by a flange and rivets $c$. The distant ends of these plates are preferably flanged as at $C'$ by which they are riveted to the wall of the chamber B. The opposite ends of the plates constituting the trough-shaped bar are flanged as at $C^2$ for being riveted to the plate K. Furthermore, these flanges $C^2$ do not extend to the bottom of the bar but leave an opening $C^3$ which comes in alinement with the opening M in the plate K to allow the free escape of water collected in the trough-shaped bar. These flanges may be formed in any other convenient manner.

From the above description and as illustrated in the drawings, it will be seen that these transverse bars are trough-shaped on the upper side to carry off the water and are V-shaped on the lower side to present oblique surfaces against which the moist air impinges and travels. The general cross section of the bars is V-shaped.

In the preferred form of my improvement, I provide the flattened lower part $C^4$ of one of the plates and which with the lower edge of the shoulder $C^5$ of the other plate provides a gutter or groove S which acts as an obstruction for the passage of the water from below the inclined face of the bar, preventing it from being forced up the inclined face at the rear. This water which is caught by the gutter S or shoulder part $C^5$ will tend to fall into the trough-shaped bar immediately below, and from the interior of this bar it will flow transversely and pass out of the aperture M into the chamber L and thence downward into the tank G. Where there is not an excess of water caught by the gutter S, it will run along the lower edge of the shouldered portion $C^5$ to the lower part of the bar and thence run downward upon the inside of the plate K and out of the aperture M of the bar next below. By means of the surface presented by the under part of the bar, the water is extracted from the air, so that by the successive impinging of the air upon the different vertical rows of bars, the excess of water is fully removed and the air passes to the blower D with only a reasonable humidity. The more vertical rows of the bars C which are employed, the drier will be the air that leaves the machine, up to the maximum humidity condition for any temperature at which the air may be.

By examining Fig. 4, it will be observed that the bars of each row are staggered somewhat with the bars of the adjacent rows so that the air passing under the bottom of the bars of the front row will impinge upon the under surface of the bars of the next row, and so on, with each row in succession. It is also evident that the air in passing below any bar in any particular row will tend to strike the inner oblique surface of the next adjacent bar below in the same row, and thereby give up an additional portion of its moisture. This air will be directed obliquely upward by this inner surface and will impinge against the under surface of the bar of the next adjacent row, and so on repeatedly. While this staggering of the bars is preferable, it is not essential, and therefore I do not restrict myself to this exact arrangement. It will also be observed that the shouldered parts $C^5$ form a gutter S but do not extend beyond the plane of the under oblique surface of the bar, and hence, while arresting the water which travels over the surface of the bar, it does not materially obstruct the free passage of the air, and is consequently, a desirable construction. If, however, it is desired to reduce the cost, the modified form shown in Fig. 6 may be employed, in which case, the flattened lower part $C^4$ is omitted and the lower extension $C^5$ is increased in length so as to project below the end of the front inclined surface of the bar and form in effect a gutter $S'$. This, however, will obstruct the air more or less, and hence is not as desirable as the structure shown in Fig. 4.

In winter time, the air passing into the purifier may be heated by means of heating pipes or coils I of any suitable character and the amount of heat may be modified by providing a suitable by-pass valve J which will permit additional air to enter the purifier without passing through the heaters and which will mingle with the heated air to reduce its temperature.

While, in general, the operation of the apparatus may be considered as having the air washed when passing through the sheets of water in the chamber A and dried by having the surplus water eliminated in passing over the bars C in the chamber B, it is evident that there will be more or less cleansing taking place in the first and perhaps the second vertical rows of these bars from the fact that the bars will have layers of water on their surfaces and the air will be caused to travel over and in contact with these layers of water, thereby producing more or less of a scrubbing effect. Any dirt thus eliminated travels off from the interior of the bars and thence downward into the tank.

The general construction of the apparatus may be varied to suit the conditions of employment and in place of an exhausting fan D, it is evident that the air may be blown through the purifier proper consisting of the parts A and B and their inclosing devices.

While I prefer the construction shown as being excellently adapted for commercial purposes, the details thereof may be modified without departing from the spirit of the invention.

Having now described my invention, what I claim as new, and desire to secure by Letters Patent, is:

1. In an air purifying apparatus, an air washer, combined with a water eliminating apparatus consisting of a series of transverse trough-shaped bars one above the other and each having a downwardly inclined front under surface directed toward the air washer and also having their lower parts provided with an obstructing shoulder and gutter adjacent thereto for arresting the water at a position immediately above the trough portion of the bar next below.

2. In an air purifying apparatus, an air washer, combined with a water eliminating apparatus consisting of a series of transverse trough-shaped bars one above the other and each having a downwardly inclined front under surface directed toward the air washer and also having their lower parts provided with an obstructing shoulder and gutter adjacent thereto for arresting the water at a position immediately above the trough portion of the bar next below and in which the said shoulder and gutter is arranged above a plane through the oblique front under surface of the bar whereby the water may be collected but the air is permitted to pass freely under the bar.

3. In an air purifying apparatus, an air washer, combined with a water eliminating apparatus consisting of a series of transverse trough-shaped bars provided with an opening at one end and arranged one above the other and each having a downwardly inclined front under surface directed toward the air washer and also having their lower parts provided with an obstructing shoulder and gutter adjacent thereto for arresting the water at a position immediately above the trough portion of the bar next below, and a chamber at one end of the said bars to which they are secured having openings in its wall in line with the openings from the trough portion of the respective bars whereby the water from the interior of the bars may freely pass into the chamber and away from the current of air.

4. In an air purifying apparatus, an air washer combined with means for eliminating or removing the water which consists of a series of trough-shaped transverse bars arranged in vertical rows, the bars of each row being arranged one above the other, the bars of adjacent rows being staggered with respect to each other, and the several bars being each further provided with a shouldered portion $C^5$ and an adjacent gutter at its lowest part.

5. In an air purifying apparatus, an air washer combined with means for eliminating or removing the water which consists of a series of trough-shaped transverse bars arranged in vertical rows, the bars of each row being arranged one above the other, the bars of adjacent rows being staggered with respect to each other, and all of the bars being arranged on an incline, and a chamber at the lowest end of the bars provided with apertures opening into the lowest portions of the trough parts of the respective bars whereby the water collected by the bars may be drained off and conveyed away out of contact with the current of air.

6. The water eliminating device for an air purifying apparatus consisting of a bar made V-shaped on its bottom and trough-shaped on its top and further provided with a shouldered portion $C^5$ and the adjacent gutter, said shoulder and gutter being at the lowest part of the bar.

7. The water eliminating device for an air purifying apparatus consisting of a bar made V-shaped on its bottom and trough-shaped on its top and further provided with a shouldered portion $C^5$ and the adjacent gutter, said shoulder and gutter being at the lowest part of the bar and above an oblique plane through the front surface of the V-shaped under portion of the bar.

8. A water separating bar for an air purifier which consists of two sheet metal parts riveted together to form a V-shaped structure and constitute a trough-shaped portion, one of said parts being provided with the flattened lower portions C⁴ and the other of said parts having the lower shoulder C⁵ extending below said flattened portion C⁴.

9. A water separating bar for an air purifier which consists of two sheet metal parts riveted together to form a V-shaped structure to constitute a trough-shaped portion, one of said parts being provided with the flattened lower portions C⁴ and the other of said parts having the lower shoulder C⁵ extending below said flattened portion C⁴, each of the parts being further provided at both ends with flanges and open at one end for drainage purposes.

10. In an air purifier, an air washer provided with a water pipe adjacent to its top and having laterally directed holes, combined with an inclosing hood having side walls against which the jets of water impinge terminating in lower edges from which the water falls in a thin sheet.

11. In an air purifier, an air washer provided with a water pipe adjacent to its top and having laterally directed holes, combined with an inclosing hood having side walls against which the jets of water impinge terminating in lower corrugated edges from which the water falls in a uniform thin sheet formed of drops close together.

12. In an air purifier, an air washer provided with a water pipe adjacent to its top and having a series of side holes, combined with a downwardly extending plate against which the jets of water from the holes impinge to spread out and drop from the lower edge of the plate in a thin sheet.

13. In an air purifier, an air washer provided with a water pipe adjacent to its top and having a series of side holes, combined with a downwardly extending plate having a lower corrugated edge against which plate the jets of water from the holes impinge to spread out and drop from the lower corrugated edge thereof in a thin sheet in the form of drops.

In testimony of which invention, I have hereunto set my hand.

WM. G. R. BRAEMER.

Witnesses:
R. M. HUNTER,
R. M. KELLY.